United States Patent
Matsumura et al.

(10) Patent No.: US 11,968,079 B2
(45) Date of Patent: Apr. 23, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 381 days.

(21) Appl. No.: 17/414,212

(22) PCT Filed: Dec. 21, 2018

(86) PCT No.: PCT/JP2018/047326
§ 371 (c)(1),
(2) Date: Jun. 15, 2021

(87) PCT Pub. No.: WO2020/129253
PCT Pub. Date: Jun. 25, 2020

(65) Prior Publication Data
US 2022/0070053 A1 Mar. 3, 2022

(51) Int. Cl.
*H04L 41/0668* (2022.01)
*H04W 72/21* (2023.01)

(52) U.S. Cl.
CPC ......... *H04L 41/0668* (2013.01); *H04W 72/21* (2023.01)

(58) Field of Classification Search
CPC .. H04L 41/0668; H04W 72/21; H04W 76/15; H04W 76/19; H04B 7/088; H04B 7/0695
See application file for complete search history.

(56) References Cited

U.S. PATENT DOCUMENTS

2021/0211181 A1* 7/2021 Yang ............... H04W 76/11

FOREIGN PATENT DOCUMENTS

WO WO-2019033072 A1 * 2/2019 ............. H04B 17/17

OTHER PUBLICATIONS

Huawei, HiSilicon, Discussion on BFR for SCell, 3GPP TSG RAN WG1 Meeting #94, Gothenburg, Sweden, Aug. 20-24, 2018, R1-1809120 (Year: 2018).*
Qualcomm Incorporated, Beam management for NR, 3GPP TSG-RAN WG1 Meeting #94, Gothenburg, Sweden, Aug. 20-24, 2018, R1-1809711. (Year: 2018).*
International Search Report issued in PCT/JP2018/047326 dated Mar. 5, 2019 (1 page).
Written Opinion of the International Searching Authority issued in PCT/JP2018/047326 dated Mar. 5, 2019 (4 pages).
Huawei, HiSilicon; "Discussion on BFR for SCell"; 3GPP TSG RAN WG1 Meeting #94, R1-1809120; Gothenburg, Sweden; Aug. 20-24, 2018 (6 pages).

(Continued)

*Primary Examiner* — Shailendra Kumar
(74) *Attorney, Agent, or Firm* — Osha Bergman Watanabe & Burton LLP

(57) ABSTRACT

A user terminal includes a control section that controls a beam failure recovery based on whether a specific secondary cell for an uplink control channel is configured or not, and a transmitting section that transmits, in the beam failure recovery, a beam failure recovery request to one of a plurality of cells. According to an aspect of the present disclosure, a BFR procedure can be appropriately executed.

7 Claims, 13 Drawing Sheets

(56) References Cited

OTHER PUBLICATIONS

Qualcomm Incorporated; "Beam management for NR"; 3GPP TSG-RAN WG1 Meeting #94, R1-1809711; Gothenburg, Sweden; Aug. 20-24, 2018 (16 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).
Extended European Search Report issued in counterpart European Patent Application No. 18943832.8, dated Jun. 10, 2022 (6 pages).
Office Action issued in the counterpart Indian Patent Application No. 202117031889, dated Jan. 3, 2023 (6 pages).
Office Action issued in Chinese Patent Application No. 201880100686.8, dated Sep. 23, 2023 (13 pages).

\* cited by examiner

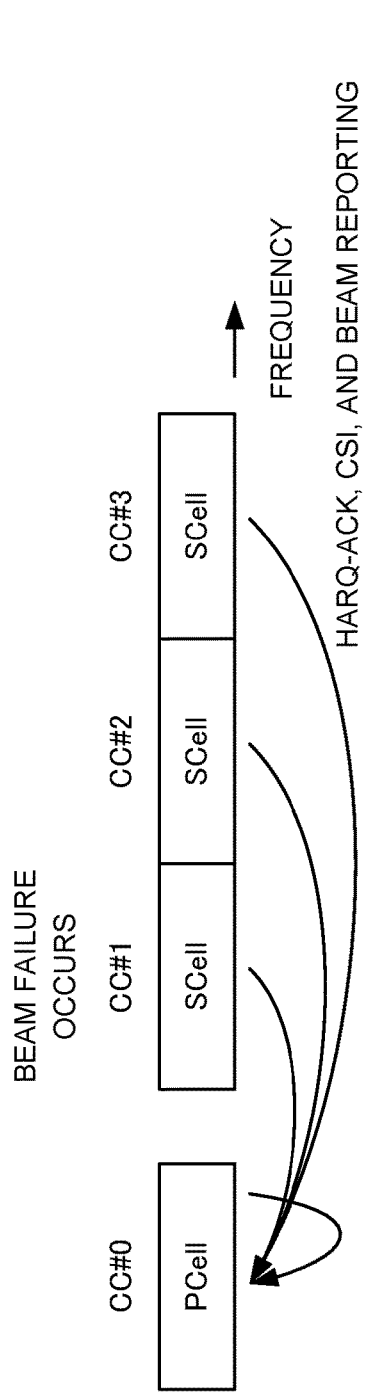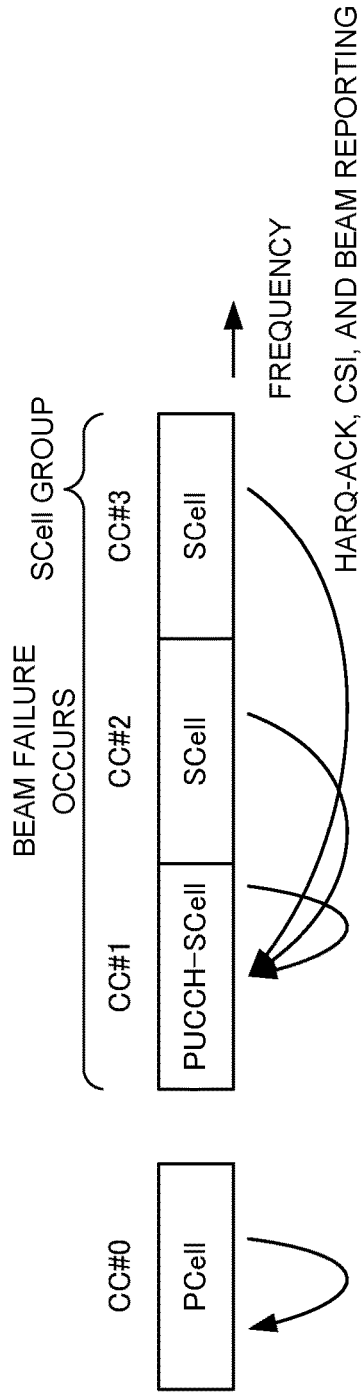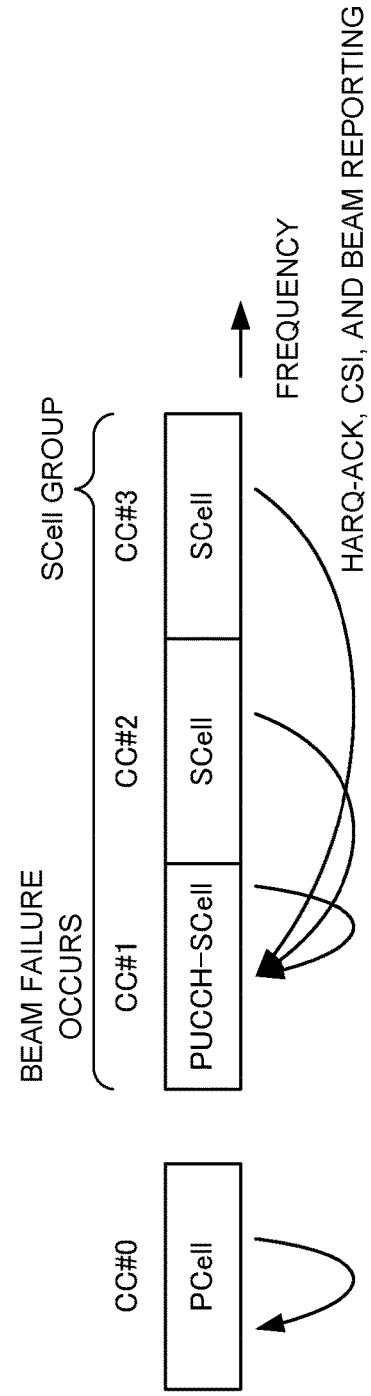

| TYPE | MAXIMUM NUMBER OF BFR-SCells |
|---|---|
| TYPE 1-BFRQ TRANSMISSION | 1 |
| TYPE 2-BFRQ TRANSMISSION | N |

FIG. 5

| TYPE | BFR RESPONSE RECEPTION |
|---|---|
| TYPE 1-BFRQ TRANSMISSION | YES |
| TYPE 2-BFRQ TRANSMISSION | NO |

FIG. 7

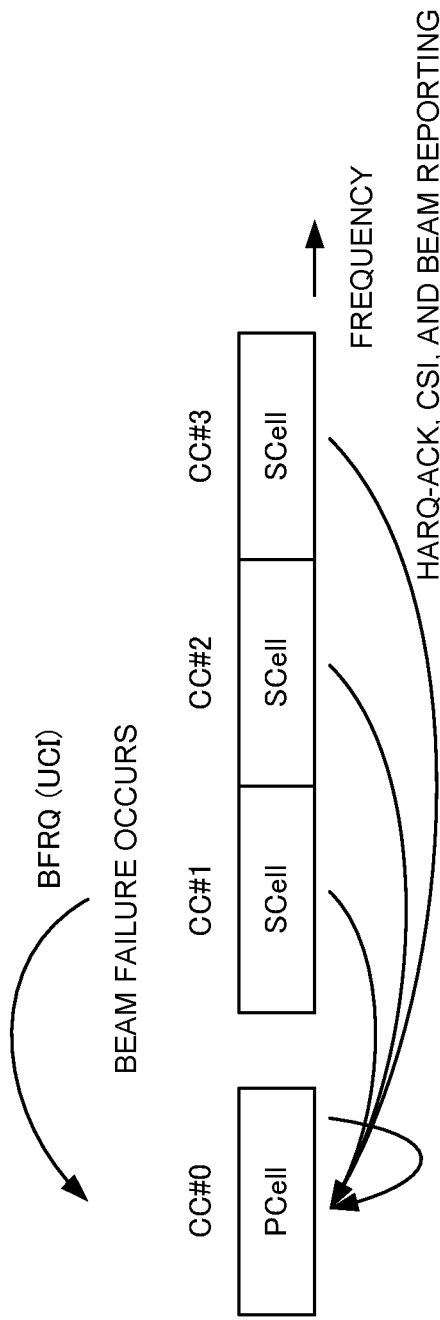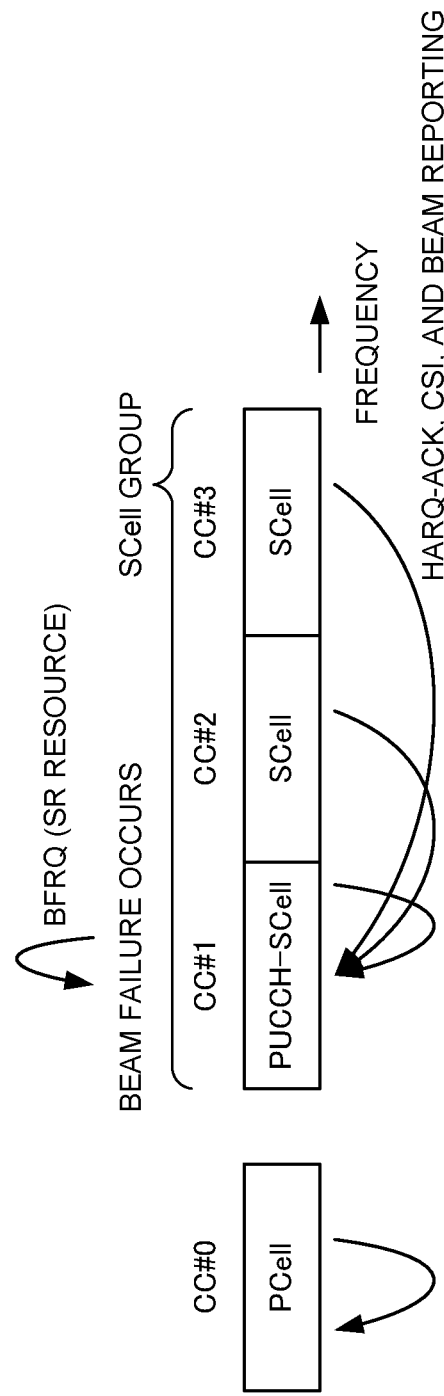

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long-Term Evolution (LTE) have been drafted for the purpose of further increasing high speed data rates, reducing latency and so on (see Non-Patent Literature 1). In addition, for further increased capacity, improved performance and so on of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (LTE Rel. 8 to Rel. 14), monitoring of radio link quality (Radio Link Monitoring (RLM)) is performed. When a radio link failure (RLF) is detected through RLM, a user terminal (User Equipment (UE)) is requested to re-establish RRC (Radio Resource Control) connection.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), studies have been conducted about implementation of a procedure for detecting a beam failure (BF) to switch to another beam (the procedure may also be referred as a beam failure recovery (BFR) procedure, a BFR, and so on). In the BFR procedure, in a case where a beam failure occurs, the UE reports a beam failure recovery request (BFRQ) for requesting a recovery from the beam failure.

However, sufficient studies have not been conducted about how a BFRQ and a response to the BFRQ (BFR response) are performed for respective cells in the BFR procedure. An inappropriate BFR procedure may lead to degraded performance of the system such as a delay in BFR.

Thus, an object of the present disclosure is to provide a user terminal and a radio communication method that appropriately execute the BFR procedure.

Solution to Problem

A user terminal according to an aspect of the present disclosure includes a control section that controls a beam failure recovery, based on whether a specific secondary cell for an uplink control channel is configured or not, and a transmitting section that transmits, in the beam failure recovery, a beam failure recovery request to one of a plurality of cells.

Advantageous Effects of Invention

According to an aspect of the present disclosure, the BFR procedure is appropriately executed.

BRIEF DESCRIPTION OF DRAWINGS

FIGS. 3A to 3C are diagrams to show examples of a case where BFR on SCell is not supported;
FIG. 5 is a diagram to show examples of a BFR-SCell maximum number for a BFRQ transmission method;
FIG. 7 is a diagram to show examples of the presence or absence of a BFR response for the BFRQ transmission method;
FIGS. 9A and 9B are diagrams to show examples of a method for determining the BFRQ transmission method.

DESCRIPTION OF EMBODIMENTS

<Beam Failure Recovery>

For NR, studies have been conducted about communication utilizing beamforming. For example, a UE and a base station (for example, a gNodeB (gNB)) may use a beam used to transmit signals (also referred to as a transmit beam, a Tx beam, and so on) and a beam used to receive signals (also referred to as a receive beam, an Rx beam, and so on).

In a case where beamforming is used, communication is expected to be likely to be affected by obstruction by an obstacle, leading to degraded radio link quality. The degraded radio link quality may lead to frequent radio link failures (RLFs). Occurrence of an RLF results in a need for reconnection of the cell, and thus frequent RLFs reduce system throughput.

For NR, studies have been conducted about implementation of a procedure for suppression of occurrence of an RLF in which, in a case where the quality of a specific beam is degraded, switching to another beam is performed (the procedure may be referred to as a beam recovery (BR), a beam failure recovery (BFR), an L1/L2 (Layer 1/Layer 2) beam recovery, and so on). Note that the BFR procedure may also be simply referred to as the BFR.

Note that the beam failure (BF) in the present disclosure may be referred to as a link failure or a radio link failure (RLF).

Figure 1:
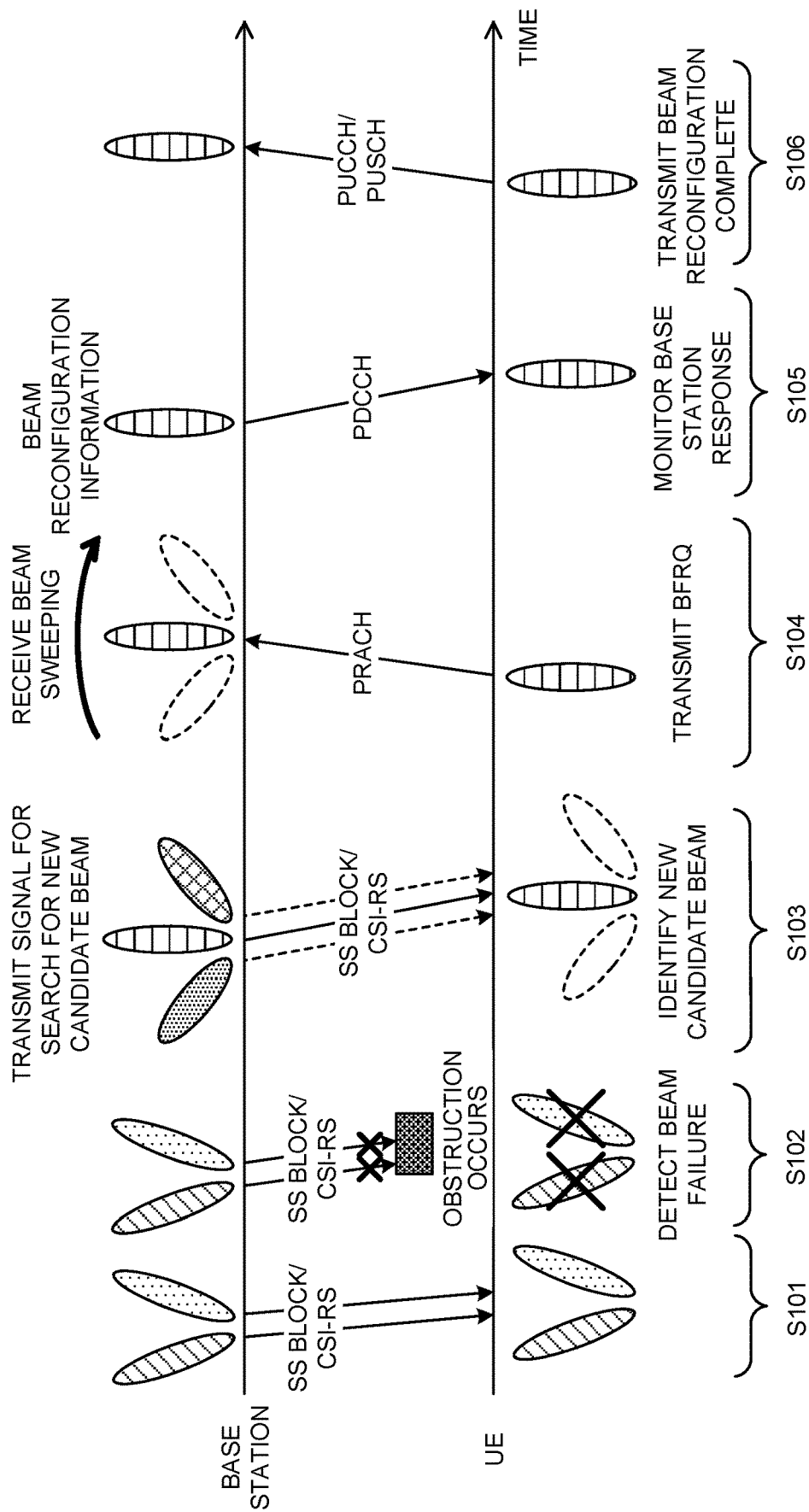
FIG. 1 is a diagram to show an example of a BFR procedure in Rel. 15 NR.

FIG. 1 is a diagram to show an example of the beam recovery procedure in Rel. 15 NR. The number of beams and so on are illustrative and are not limited to those in FIG. 1. In an initial state (step S101) in FIG. 1, the UE performs measurement based on a reference signal (RS) resource transmitted by using two beams.

The RS may be at least one of a synchronization signal block (SSB) and an RS for channel state measurement (Channel State Information RS (CSI-RS)). Note that the SSB may be referred to as an SS/PBCH (Physical Broadcast Channel) block.

The RS may be at least one of a primary synchronization signal (Primary SS (PSS)), a secondary synchronization signal (Secondary SS (SSS)), a mobility reference signal (Mobility RS (MRS)), signals included in the SSB, the SSB, the CSI-RS, a demodulation reference signal (DMRS), a beam-specific signal, and so on, or a signal configured by performing expansion, change, or the like of any of the listed signals. The RS measured in step S101 may be referred to as a beam failure detection RS (BFD-RS) and so on.

In step S102, a radio wave from the base station is obstructed, and thus the UE fails to detect the BFD-RS (or reception quality of the RS is degraded). Such obstruction may result from, for example, the adverse effect of an obstacle, fading, interference, or the like between the UE and the base station.

The UE detects a beam failure when a given condition is satisfied. The UE may detect the occurrence of a beam failure, for example, in a case where a block error rate (BLER) is lower than a threshold for all configured BFD-RSs (BFD-RS resource configuration). When the occurrence of a beam failure is detected, a lower layer of the UE (physical (PHY) layer) may report (indicate) a beam failure instance to a higher layer (MAC layer).

Note that a determination criterion is not limited to the BLER but may be reference signal received power in the physical layer (Layer 1 Reference Signal Received Power (L1-RSRP)). The beam failure detection may be performed based on a downlink control channel (Physical Downlink Control Channel (PDCCH)) or the like instead of or in addition to the RS measurement. The BFD-RS may be expected to be in a quasi-co-location (QCL) relationship with the DMRS of the PDCCH, monitored by the UE.

Here, the QCL is an indicator indicating the statistical property of a channel. For example, the QCL may mean that, in a case where one signal/channel and another signal/channel are in the QCL relationship, at least one of a Doppler shift, a Doppler spread, an average delay, a delay spread, and a spatial parameter (for example, a spatial reception parameter (spatial Rx parameter)) can be assumed to be identical (the QCL relationship is satisfied for at least one of these parameters) between the plurality of different signals/channels.

Note that the spatial reception parameter may correspond to the receive beam of the UE (for example, a reception analog beam) and that the beam may be identified based on the spatial QCL. The QCL in the present disclosure (or at least one element of the QCL) may be interpreted as a spatial QCL (sQCL).

Information related to the BFD-RS (for example, indices, resources, the number of RSs, the number of ports, precoding, and so on for the RS), information related to the beam failure detection (BFD) (for example, the above-described threshold), and the like may be configured for (reported to) the UE by using higher layer signaling or the like. The information related to the BFD-RS may be referred to as information related to BFR resources.

In the present disclosure, for example, the higher layer signaling may be any one or any combination of Radio Resource Control (RRC) signaling, Medium Access Control (MAC) signaling, broadcast information, and so on.

For example, the MAC signaling may use MAC control elements (MAC CE), MAC Protocol Data Units (PDUs), and so on. For example, the broadcast information may be master information blocks (MIBs), system information blocks (SIBs), minimum system information (Remaining Minimum System Information (RMSI)), other system information (OSI), and so on.

In a case of receiving a beam failure instance report from the PHY layer of the UE, the MAC layer of the UE may start a given timer (that may be referred to as a beam failure detection timer). In a case of receiving the beam failure instance report a specific number of times (for example, beamFailureInstanceMaxCount configured by RRC) or more before the timer expires, the MAC layer of the UE may trigger the BFR (for example, initiate any one of the random access procedures described below).

In a case of receiving no report from the UE (for example, the time for which no report is received exceeds a given time) or receiving a given signal (beam recovery request in step S104) from the UE, the base station may determine that the UE has detected a beam failure.

In step S103, the UE starts searching for a new candidate beam to be newly used in communication for beam recovery. By measuring a given RS, the UE may select a new candidate beam corresponding to the RS. The RS measured in step S103 may be referred to as an RS for new candidate beam identification (New Candidate Beam Identification RS (NCBI-RS)), CBI-RS, Candidate Beam RS (CB-RS), and so on. The NCBI-RS may be the same as or different from the BFD-RS. Note that the new candidate beam may also be simply referred to as a candidate beam.

The UE may determine a beam corresponding to the RS satisfying the given condition to be a new candidate beam. The UE may determine the new candidate beam, for example, based on RSs of the configured NCBI-RSs for which the L1-RSRP exceeds a threshold. Note that the determination criterion is not limited to the L1-RSRP. At least one of the L1-RSRP, L1-RSRQ, and L1-SINR (signal-to-noise interference power ratio) may be used for the determination. The L1-RSRP related to the SSB may be referred to as SS-RSRP. The L1-RSRP related to the CSI-RS may be referred to as CSI-RSRP. Similarly, the L1-RSRQ related to the SSB may be referred to as SS-RSRQ. The L1-RSRQ related to the CSI-RS may be referred to as CSI-RSRQ. Similarly, the L1-SINR related to the SSB may be referred to as the SS-SINR. The L1-SINR related to the CSI-RS may be referred to as CSI-SINR.

Information related to the NCBI-RS (for example, resources, the number of RSs, the number of ports, precoding, and so on for the RS), information related to the new candidate beam identification (NCBI) (for example, the above-described threshold), and the like may be configured for (reported to) the UE by using higher layer signaling or the like. The information related to the NCBI-RS may be acquired based on information related to the BFD-RS. The information related to the NCBI-RS may be referred to as information related to an NCBI resource and so on.

Note that the BFD-RS, NCBI-RS, or the like may be interpreted as a radio link monitoring reference signal (Radio Link Monitoring RS (RLM-RS)).

In step S104, the UE, having identified the new candidate beam, transmits a beam failure recovery request (BFRQ). The beam recovery request may be referred to as a beam recovery request signal, a beam failure recovery request signal, and so on.

The BFRQ may be transmitted by using at least one of, for example, an uplink control channel (Physical Uplink Control Channel (PUCCH)), a random access channel (Physical Random Access Channel (PRACH)), an uplink shared channel (Physical Uplink Shared Channel (PUSCH)), and a configured grant PUSCH.

The BFRQ may include information regarding the new candidate beam identified in step S103. A resource for the BFRQ may be associated with the new candidate beam. Information regarding the beam may be reported by using a beam index (BI), a port index of a given reference signal, a resource index (for example, a CSI-RS resource indicator (CRI), an SSB resource indicator (SSBRI), and so on.

In Rel. 15 NR, studies have been conducted about a CB-BFR (Contention-Based BFR) corresponding to a BFR based on a contention-based random access (RA) procedure and CF-BFR (Contention-Free BFR) corresponding to a BFR based on a contention-free random access procedure. In the CB-BFR and the CF-BFR, the UE may use a PRACH resource to perform transmission by using a preamble (also referred to as an RA preamble, a random access channel (Physical Random Access Channel (PRACH)), a RACH preamble, and so on) as a BFRQ.

For NR, a plurality of PRACH formats (PRACH preamble formats) are under study. The random access (RA) preamble using each PRACH format includes a RACH OFDM symbol. Furthermore, the RA preamble may include at least one of a cyclic prefix (CP) and a guard period (GP). For example, PRACH formats 0 to 3 use a long preamble sequence in RACH OFDM symbols. PRACH formats A1 to A3, B1 to B4, C0, and C2 use a short preamble sequence in RACH OFDM symbols.

The frequency of a carrier may be within either a frequency range (FR) 1 or FR2. FR1 is a frequency range lower than a given frequency, and FR2 may be a frequency range higher than a given frequency.

The RA preamble sequence may also be a Zadoff-Chu (ZC) sequence. A preamble sequence length may be either 839 (long sequence) or 139. The preamble sequence may be mapped to a frequency resource (for example, a subcarrier) allocated to the PRACH. As the RA preamble, one of a plurality of numerologies may be used. A subcarrier spacing (SCS) for a long sequence for the NR FR1 may be one of 1.25 kHz and 5 kHz. The SCS for a short sequence for the NR FR1 may be one of 15 kHz and 30 kHz. The SCS for a short sequence for the NR FR2 may be one of 60 kHz and 120 kHz. The SCS for a long sequence for LTE may be 1.25 kHz. The SCS for a short sequence for LTE may be 7.5 kHz.

In the CB-BFR, the UE may transmit a preamble randomly selected from one or more preambles. On the other hand, in the CF-BFR, the UE may transmit a UE-specific preamble allocated by the base station. In the CB-BFR, the base station may allocate an identical preamble to a plurality of UEs. On the other hand, in the CF-BFR, the base station may allocate a UE-specific preamble.

Note that the CB-BFR and the CF-BFR may be respectively referred to as a CB PRACH-based BFR (contention-based PRACH-based BFR (CBRA-BFR)) and a CF PRACH-based BFR (contention-free PRACH-based BFR (CFRA-BFR)). The CBRA-BFR may be referred to as CBRA for BFR. The CFRA-BFR may be referred to as CFRA for BFR.

In both CB-BFR and CF-BFR, information related to the PRACH resource (RA preamble) may be reported by using higher layer signaling (RRC signaling or the like), for example. For example, the information may include information indicating a correspondence relationship between the DL-RS (beam) detected and the PRACH resource, and the DL-RS may be associated with the PRACH resource varying with DL-RS.

In step S105, the base station detects a BFRQ and then transmits a response signal to the BFRQ from the UE (the response signal may be referred to as a gNB response and so on). The response signal may include reconfiguration information for one or more beams (for example, configuration information regarding the DL-RS resource).

The response signal may be transmitted, for example, in a UE common search space for the PDCCH. The response signal may be reported by using the PDCCH (DCI) with a cyclic redundancy check (CRC) scrambled with the identifier of the UE (for example, a cell-radio RNTI (C-RNTI)). The UE may determine at least one of the transmit beam and receive beam used, based on the beam reconfiguration information.

The UE may monitor the response signal, based on at least one of a control resource set (CORESET) for BFR and a search space set for BFR. For example, the UE may detect the DCI with the CRC scrambled with the C-RNTI, in a BFR search space within the CORESET individually configured.

For the CB-BFR, contention resolution may be determined to be successful in a case where the UE receives the PDCCH corresponding to the C-RNTI related to the UE.

For the processing in step S105, a period may be configured during which the UE monitors a response to the BFRQ transmitted from the base station (for example, a gNB). The period may be referred to as, for example, a gNB response window, a gNB window, a beam recovery request response window, a BFRQ response window, and so on. In a case of detecting no gNB response during the window period, the UE may re-transmit a BFRQ.

In step S106, the UE may transmit, to the base station, a message indicating that the beam reconfiguration is complete. The message may be, for example, transmitted by using the PUCCH or transmitted by using the PUSCH.

In step S106, the UE may receive RRC signaling indicating the configuration of a TCI state used for the PDCCH or receive the MAC CE indicating activation of the configuration.

A beam recovery success (BR success) may represent, for example, a case where step S106 is reached. On the other hand, a beam recovery failure (BR failure) may correspond to, for example, the number of BFRQ transmissions having reached a given value or a beam-failure-recovery-timer having expired.

Note that these step numbers are only numbers for description and that a plurality of steps may be brought together or the number of the steps may be changed. Whether the BFR is performed or not may be configured for the UE by using higher layer signaling.

Incidentally, as described above, the existing LTE systems specify that, in a case where a plurality of cells are utilized for communication, the BFR is performed only on a given cell (for example, a primary cell), but for NR, studies have been conducted about application of the BFR procedure to a plurality of cells.

Figure 2:
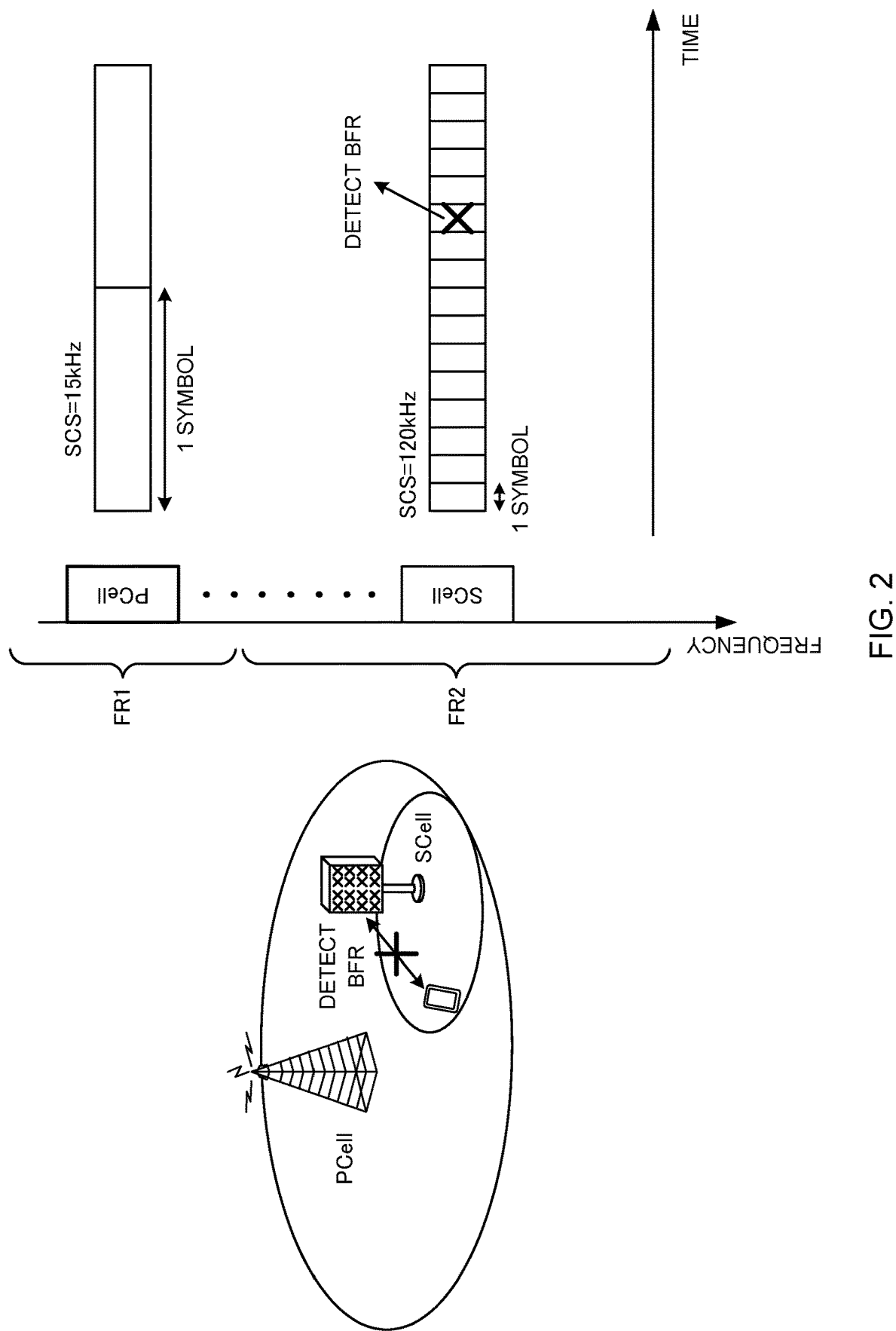
FIG. 2 is a diagram to show an example of inter-band CA.

Configurations performing communication by utilizing a plurality of cells include, for example, intra-band carrier aggregation (Intra-band CA) or inter-band carrier aggregation (Inter-band CA). FIG. 2 is a diagram to show an example of application of inter-band CA.

FIG. 2 shows a case where, as a plurality of frequency bands, frequency bands (carrier frequencies) are used that are included in at least one of a first frequency range (FR1) and a second frequency range (FR2). Note that the present disclosure is not limited to two frequency bands applied but that the frequency band (or frequency domain) may be partitioned into three frequency bands.

For example, FR1 may be a frequency band of 6 GHz or less (sub-6 GHz), and FR2 may be a frequency band which is higher than 24 GHz (above-24 GHz). FR1 may be defined as a frequency range for which at least one of 15 kHz, 30 kHz, and 60 kHz is used as a sub-carrier spacing (SCS), or FR2 may be defined as a frequency range for which at least one of 60 kHz and 120 kHz is used as an SCS. Note that the frequency bands, definitions and so on of FR1 and FR2 are by no means limited to these, and for example, FR1 may correspond to a frequency band which is higher than FR2.

A cell utilizing FR1 and a cell utilizing FR2 may be configurations employing different numerologies (for example, subcarrier spacings). FIG. 2 shows, as an example, a case where the subcarrier spacing (SCS) employed by a cell included in FR1 is 15 kHz and where the subcarrier spacing employed by a cell included in FR2 is 120 kHz. Note that cells included in the same frequency band may employ different numerologies.

FIG. 2 is a diagram to show a case where CA (for example, FR1-FR2 CA) is employed across a plurality of frequency bands. In this case, CA is employed between one or more cells included in FR1 and one or more cells included in FR2. In this case, a specific cell included in FR1 or FR2 may be used as a primary cell. FIG. 2 shows a case where a cell included in FR1 is used as a primary cell, whereas cells included in FR2 are used as secondary cells.

The UE executes the BFR procedure in a case where, in a configuration utilizing a plurality of cells (for example, see FIG. 2), a beam failure (BF) occurs in any of the cells. For example, the UE transmits the BFRQ by utilizing the PRACH or the like in a given cell configured in advance.

For example, in a case where a BF occurs in a secondary cell included in FR2, the problem is how to control an operation for reporting the BFRQ (for example, selection of a cell and a channel transmitted) or an operation such as a response to the report transmitted from the base station. In a case where the BFR procedure is executed on a plurality of cells, degradation of communication quality and the like may occur when reporting of the BFRQ, a response to the reporting, or the like is not appropriately controlled.

In a case where the primary cell (for example, FR1) and the secondary cell (for example, FR2) have different numerologies and the like, for the BFR procedure for the secondary cell, the secondary cell (or the cell of FR2) may be utilized.

The uplink control channel enables resources to be more flexibly configured in the time domain than the PRACH. Thus, the uplink control channel (PUCCH) may be utilized as a channel utilized to transmit the BFRQ. The MAC CE and the PUSCH enable resources to be more flexibly configured in the time domain than the PRACH. Thus, the MAC CE and PUSCH may be utilized as channels utilized to transmit the BFRQ.

For NR, studies have been conducted about a configuration (also referred to as a format, a PUCCH format (PF), or the like) for an uplink control channel used to transmit the UCI (for example, the PUCCH). For example, for Rel. 15, support of five types PF0 to PF4 has been under study. Note that the names of PF shown below are only illustrative and that different names may be used.

For example, PF0 and PF1 are PFs used to transmit UCI (also referred to as, for example, transmission confirmation information (Hybrid Automatic Repeat reQuest-Acknowledgement (HARQ-ACK)), ACK, NACK, or the like) of up to 2 bits. PF0 can be allocated to one or two symbols and is thus referred to as a short PUCCH. PF0 uses a sequence based on a cyclic shift corresponding to UCI and is thus referred to as a sequence-based short PUCCH and so on. On the other hand, PF1 can be allocated to 4 to 14 symbols and is thus referred to as a long PUCCH and so on. For PF1, block-wise spreading in the time domain using at least one of CS and OCC may be used to multiplex a plurality of user terminals in code division multiplexing (CDM) within an identical physical resource block (PRB or referred to as a resource block (RB) and so on).

PF2 to PF4 are PFs used to transmit UCI (for example, channel state information (CSI) or CSI and HARQ-ACK and/or a scheduling request (SR)) of more than 2 bits. PF2 can be allocated to one or two symbols and is thus referred to as a short PUCCH and so on. On the other hand, PF3 and PF4 can be allocated to 4 to 14 symbols and is thus referred to as a long PUCCH and so on. For PF4, block-wise spreading before DFT (frequency domain) may be used to multiplex a plurality of user terminals in CDM.

The UE may support BFR on SCell. Application of the BFR on SCell to an SCell may be interpreted as at least one of detection of a BF in the SCell, transmission of a BFRQ to the SCell, and reception of a BFR response from the SCell.

However, in a case where the UE applies the BFR on SCell to all the SCells, the processing in the UE may be complicated, possibly increasing the cost of the UE.

The problem is to which of the SCells the BFR on SCell is applied (in which of the SCells a BF is detected, to which of the SCells a BFRQ is to be transmitted, from which of the SCells a BFR response is to be received, and so on). In a case where the BFR is not configured for the appropriate SCell, a delay in the BFR procedure or the like may lead to degraded performance of the system.

Now, a problem will be described that occurs in a case where the BFR on SCell is not supported.

A case where intra-band CA is configured for the UE will be described. The intra-band CA may be a combination of a band within FR1 and a band within FR1 or a combination of a band within FR2 and a band within FR2. As illustrated in FIG. 3A, in a case where the PUCCH on SCell is not configured for the UE, the UE transmits, in the PCell, at least one of HARQ-ACK and CSI for the SCell. In this case, the base station can recognize a BF in the SCell. For example, in a case where at least one of the HARQ-ACK and CSI for the SCell does not satisfy a given condition (a specific parameter in the CSI is smaller than a given threshold, the number of NACKs is larger than a threshold, or the like), the base station recognizes a BF in the SCell.

A case where inter-band CA is configured for the UE will be described. The inter-band CA may be a combination of a band within FR1 and a band within FR2, a combination of different bands in FR1, or a combination of different bands within FR2. In particular, in the inter-band CA between FR1 and FR2, in a case where the numerology for CCs in FR1 differs from the numerology for CCs in FR2, many PUCCHs are included in the PCell when the PUCCH on SCell is not configured for the UE. Thus, the PUCCH on SCell may be configured for the UE by using higher layer signaling. The UE transmits, in the SCell, at least one of HARQ-ACK and CSI for the SCell. In this case, a possible failure in the SCell may preclude the base station from recognizing a BF in the SCell.

As shown in FIG. 3B, in a case where a BF occurs in an SCell other than the SCell (PUCCH-SCell) for which the PUCCH on SCell is configured, the UE transmits the BFRQ in the PUCCH-SCell, allowing the base station to recognize the BF. As shown in FIG. 3C, in a case where a BF occurs in the PUCCH-SCell, the UE fails to transmit the BFRQ in the PUCCH-SCell, precluding the base station from recognizing the BF.

As described above, in a case where the PUCCH-SCell is configured for the UE and a BF occurs in the PUCCH-SCell, the base station may fail to recognize the BF.

In the BFR procedure in Rel. 15 NR, in a case where the UE detects the DCI with the CRC scrambled with the C-RNTI, in the BFR search space in the BFR-dedicated CORESET, the UE considers that the BFR is complete.

The BFR search space is associated with the CORESET on a one-to-one basis, and thus the CORESET associated with the BFR search space fails to be associated with other search space. There is an upper limit for the number of configurable CORESETs (for example, three), and thus performing the BFR procedure may limit other scheduling. For example, when CORESET #0 and CORESET for BFR are used, only one CORESET is configurable for other purpose. Limited scheduling may lead to degraded performance of the system due to a reduced throughput and the like.

Thus, the inventors of the present invention came up with the idea of a UE operation for appropriately executing the BFR procedure. For example, the UE may control a beam failure recovery based on whether a specific secondary cell for an uplink control channel is configured, and transmit, in the beam failure recovery, a beam failure recovery request to one of a plurality of cells.

Embodiments according to the present disclosure will be described in detail with reference to the drawings. The following aspects may be employed independently or may be employed in combination.

Note that the problems with the scenario for the inter-band CA between FR1 and FR2 have been described but that the embodiments can be applied to, instead of the inter-band CA between FR1 and FR2, the inter-band CA between FR1 and FR1, the inter-band CA between FR2 and FR2, and the intra-band CA in FR1 or FR2.

In the present disclosure, the SCell supporting the BFR on SCell may be interpreted as the SCell to which the BFR on SCell is applicable. The SCell to which the BFR on SCell is applied may be interpreted as the BFR-SCell, the SCell for BFR, and so on. The number of SCells to which the BFR on SCell is applied may be interpreted as the number of BFR-SCells. The number of SCells supporting the BFR on SCell may be interpreted as a BFR-SCell maximum number.

(Radio Communication Method)

First Embodiment

The number of SCells supporting the BFR on SCell (BFR-SCell maximum number) may be limited.

The BFR-SCell may be at least one of the SCell detecting a BF, the SCell to which a BFRQ is to be transmitted, and the SCell from which a BFR response is to be transmitted. The number of BFR-SCells may be equal to or smaller than the BFR-SCell maximum number. The BFR-SCell maximum number may be smaller than the number of all SCells configured for the UE.

The BFR-SCell maximum number may be limited by at least one of Embodiments 1-1 to 1-3 below.

Embodiment 1-1

The BFR-SCell maximum number may be defined by specifications.

Embodiment 1-2

The UE may report capability information regarding the BFR on SCell. For example, the UE may report the BFR-SCell maximum number by using UE capability signaling (UE capability information and UE capability information elements).

For example, candidate values {0, 1, . . . , 31} for the BFR-SCell maximum number may be defined in the specifications, and the UE may report one of the candidate values for the BFR-SCell maximum number. The maximum value of the candidate values may be the maximum number of SCells (maxNrofSCells) or the maximum value of the SCell index {1, 2, . . . , 31}. The UE need not assume that the BFR on SCell is configured for the SCells the number of which is larger than the reported value.

Embodiment 1-3

A plurality of BFRQ transmission methods may be defined in the specifications. The plurality of BFRQ transmission methods may be at least two of a Scheduling Request (SR) on the PRACH or PUCCH, Uplink Control Information (UCI) on the PUCCH, and the MAC CE (PUSCH). The UE may use one of the plurality of BFRQ transmission methods to transmit a BFRQ.

Figure 4:
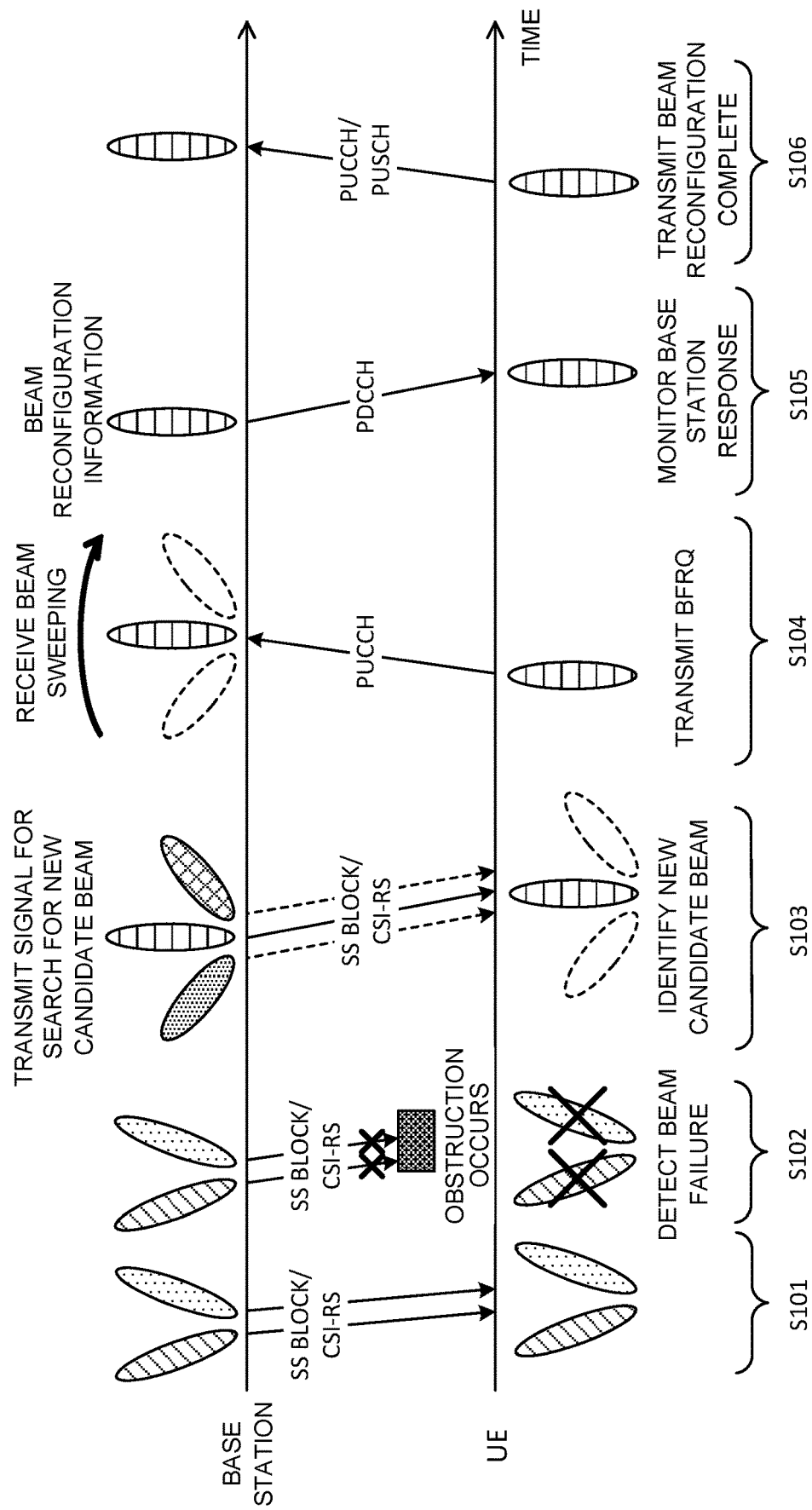
FIG. 4 is a diagram to show an example of a BFR procedure for transmitting a BFRQ by using a PUCCH.

FIG. 4 is a diagram to show an example of the BFR procedure for transmitting a BFRQ by using the PUCCH. In comparison to FIG. 1, FIG. 4 shows that, in S104, the UE uses the PUCCH instead of the PRACH to transmit a BFRQ. The other operations are similar to the corresponding operations in FIG. 1.

The upper limit value of the maximum value of BFR-SCells for each of the plurality of BFRQ transmission methods may be defined in the specifications or configured by using higher layer signaling. The plurality of BFRQ transmission methods may be divided into first BFRQ transmission methods and second BFRQ transmission methods. The first BFRQ transmission methods may be referred to as type 1-BFRQ transmission, and the second BFRQ transmission methods may be referred to as type 2-BFRQ transmission. The first BFRQ transmission methods may be referred to as type A-BFRQ transmission, and the second BFRQ transmission methods may be referred to as type B-BFRQ transmission.

The BFR-SCell maximum number in the use of the type 1-BFRQ transmission may be smaller than the BFR-SCell maximum number in the use of the type 2-BFRQ transmission. For example, as shown in FIG. 5, the BFR-SCell maximum number in the use of the type 1-BFRQ transmission may be 1. The BFR-SCell maximum number in the use of the type 2-BFRQ transmission may be N. N may be larger than 1.

The type 1-BFRQ transmission may be a BFRQ transmission method in which dedicated resources for the BFRQ are reserved. The type 2-BFRQ transmission may be a BFRQ transmission method in which no dedicated resources for the BFRQ are reserved. In the type 1-BFRQ transmission, reserving dedicated resources for the BFRQ in a plurality of SCells reduces resource use efficiency, and thus the BFR-SCell maximum number in the use of the type 1-BFRQ transmission may be smaller than the BFR-SCell maximum number in the use of the type 2-BFRQ transmission.

The type 1-BFRQ transmission may include BFRQ transmission using the PRACH (for example, S104 in FIG. 1). The type 1-BFRQ transmission may include BFRQ transmission using SR resources on the PUCCH (SR-based BFRQ transmission).

For the UE, one PUCCH resource (for example, an SR resource or a BFRQ resource) may be configured for the BFRQ, and when detecting a BF, the UE may transmit the PUCCH in the configured PUCCH resource (SR-based BFRQ transmission 1). The SR-based BFRQ transmission 1 reserves one dedicated resource. In a case where the base station receives the PUCCH in the configured PUCCH resource, the base station may recognize that a BF has occurred.

For the UE, a plurality of (the number of candidate beams) PUCCH resources (for example, SR resources, BFR resources, or different symbols for the respective candidate beams) may be configured for the BFRQ, and when detecting a BF and determining a new beam, the UE may transmit the PUCCH in the PUCCH resource corresponding to the new beam (SR-based BFRQ transmission 2). The SR-based BFRQ transmission 1 reserves a plurality of dedicated resources. In a case of receiving the PUCCH in one of the configured PUCCH resources, the base station may recognize that a BF has occurred. The base station may recognize the new beam corresponding to the PUCCH resource in which the PUCCH has been received.

The type 2-BFRQ transmission may include BFRQ transmission using the UCI on the PUCCH (UCI-based BFRQ transmission). When detecting a BF, the UE may transmit UCI bits including a BFRQ information bit. The UCI bits may include an HARQ-ACK information bit or CSI. The BFRQ information bit may be 1 bit and indicate whether a BF has occurred or not. The BFRQ information bit may include a plurality of bit sequences and indicate the new beam (ID) corresponding to the occurrence of the BF.

The type 2-BFRQ transmission may include BFRQ transmission using the MAC CE. When detecting a BF, the UE may transmit the MAC CE including the BFRQ information bit.

The type 1-BFRQ transmission may include CFRA, and the type 2-BFRQ transmission may include CBRA.

According to the first embodiment described above, the SCells (BFR-SCells) to which the BFR on SCell is applied can be limited, and thus loads on the UE can be reduced, allowing suppression of an increase in the cost of the UE.

Second Embodiment

In a case where application of the BFR on SCell to all SCells is not supported (the BFR on SCell is not supported in at least one SCell or the BFR-SCell maximum number is smaller than the number of SCells configured), the UE recognizes on which of the SCells the BFR on SCell is to be performed.

The UE for which the BFR on SCell is configured or the UE for which the BFR on SCell is configured may apply the BFR on SCell to up to the BFR-SCell maximum number of SCells.

At least the PUCCH-SCell may support the BFR on SCell (BFR on SCell may be applied at least to the PUCCH-SCell). The UE for which the BFR on SCell is configured may assume that at least the PUCCH-SCell supports the BFR on SCell.

The UE may perform at least one of the operations in Embodiments 2-1 to 2-4 described below.

Embodiment 2-1

In a case where the BFR-SCell maximum number is 1, the UE may assume that only the PUCCH-SCell supports the BFR on SCell (may assume that BFR on SCell is applicable only to the PUCCH-SCell).

Embodiment 2-2

The cell indices (serving cell indices or SCell indices) of the SCells supporting the BFR on SCell (the SCells to which the BFR on SCell is applicable) need not be indicated to the UE.

Based on the priority of each SCell, the UE may recognize (select or determine) the SCell to which the BFR on SCell is applied. The UE may apply the BFR on SCell to up to the BFR-SCell maximum number of SCells in order of priority.

The PUCCH-SCell may have the highest priority, and the other SCells have the priorities in order of increasing cell index. For example, in a case where SCells #1, #2, #3, and #4 are configured that are represented by cell indices and the SCell #4 is the PUCCH-SCell, the UE may select the SCell to which the BFR on SCell is applied, in the order of the SCells #4, #1, #2, and #3.

The PUCCH-SCell may have the highest priority, and the other SCells have the priorities in order of decreasing cell index. For example, in a case where SCells #1, #2, #3, and #4 are configured that are represented by cell indices and the SCell #4 is the PUCCH-SCell, the UE may select the SCell to which the BFR on SCell is applied, in the order of the SCells #4, #3, #2, and #1.

Embodiment 2-3

The cell indices (serving cell indices or SCell indices) of the SCells supporting the BFR on SCell (the SCells to which the BFR on SCell is applicable) may be indicated to the UE.

Based on the priority of a specific SCell, the UE may recognize (select or determine) the SCell to which the BFR on SCell is applied. The UE may apply the BFR on SCell to up to the BFR-SCell maximum number of SCells in order of priority.

The PUCCH-SCell may have the highest priority. The cell indices (cell index list) indicating the SCells to which the BFR on SCell is applicable and not involving the PUCCH-SCell may be indicated to the UE. The priorities of the indicated SCells may be in the indicated order. For example, in a case where SCells #1, #2, #3, and #4 are configured that are represented by cell indices and the SCell #4 is the PUCCH-SCell and as the SCells to which the UE can apply the BFR on SCell, the cell index list is indicated that includes SCells #1, #2, and #3 in this order, then the UE may select the SCell to which the BFR on SCell is applied, in the order of the SCells #4, #1, #2, and #3.

In a case where the PUCCH-SCell is configured for the UE and the cell indices of the SCells to which the BFR on SCell is applicable are not indicated to the UE, the UE may perform the BFR on SCell exclusively on the PUCCH-SCell.

Embodiment 2-4

The cell indices (serving cell indices or SCell indices) of the SCells supporting the BFR on SCell (the SCells to which the BFR on SCell is applicable) may be indicated to the UE.

As the SCells to which the BFR on SCell is applicable, the cell indices involving the PUCCH-SCell (cell index list) may be indicated to the UE. By assuming that the indicated SCells include the PUCCH-SCell, the UE may execute at least one of the BF detection and the BFR procedure.

In a case where the BFR-SCell maximum number is 1, as the SCells to which the BFR on SCell is applicable, the cell index of the PUCCH-SCell may be indicated to the UE. In this case, the UE may perform at least one of the BF detection and the BFR procedure on the assumption that the indicated SCell is the PUCCH-SCell. In a case where the BFR-SCell maximum number is 1, the processing may be based on the first embodiment. Specifically, the case where the BFR-SCell maximum number is 1 may be a case where the BFR-SCell maximum number=1 is defined by the specifications, a case where the UE reports the BFR-SCell maximum number=1, or a case where the BFR-SCell maximum number is 1 that corresponds to the BFRQ transmission method used (configured) and included in a plurality of BFRQ transmission methods.

In a case where the cell indices of the SCells to which the BFR on SCell is applicable are not indicated to the UE, the UE may assume that the BFR on SCell is applicable only to the PUCCH-SCell. In a case where the BFR-SCell maximum number is 1 and where the cell indices of the SCells to which the BFR on SCell is applicable are not indicated, the UE may assume that the BFR on SCell is applicable only to the PUCCH-SCell.

In a case where the PUCCH-SCell is configured for the UE and the cell indices of the SCells to which the BFR on SCell is applicable are not indicated to the UE, the UE may apply the BFR on SCell exclusively to the PUCCH-SCell.

According to the second embodiment described above, in a case where the BFR-SCell maximum number is 1 or more and where the BFR on SCell is configured for the UE, the UE may apply the BFR on SCell at least to the PUCCH-SCell. In a case where a BF occurs in the PUCCH-SCell, the UE detects the BF and transmits a BFRQ to any one of the cells (for example, the PUCCH-SCell), allowing the base station to recognize the BF. In a case where a BF occurs in an SCell other than the PUCCH-SCell, the base station can recognize the BF by using the PUCCH (at least one of the HARQ-ACK and CSI) in the PUCCH-SCell. Accordingly, the base station can recognize a BF in all of the SCells to perform the BFR.

Third Embodiment

An operation for completing the BFR procedure will be described.

In the BFR procedure, the UE may perform at least one of the operations in Embodiments 3-1 to 3-5 described below.

Embodiment 3-1

Figure 6A:
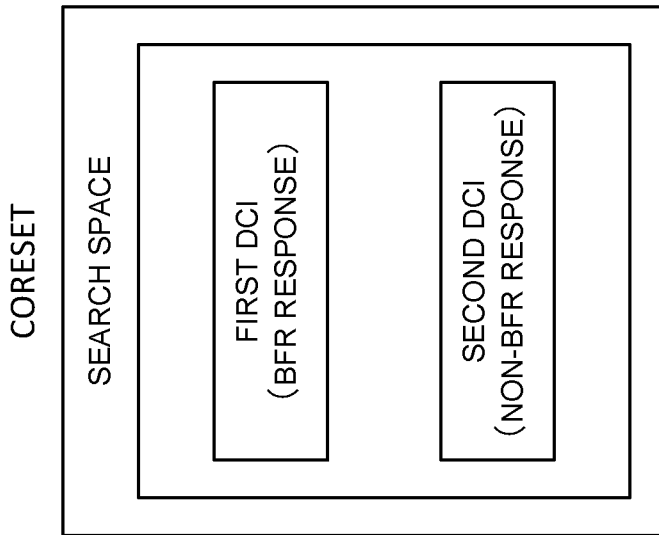
FIGS. 6A and 6B are diagrams to show examples of a search space and a CORESET used for a BFR response.

As shown in FIG. 6A, the CORESET including the BFR search space for a BFR response may include other search space. In other words, the CORESET associated with the BFR search space may be associated with other search space. The UE may assume that the CORESET associated with the BFR search space may be associated with other search space. The BFR response may be DCI or BFR RAR. The BFR search space may be identified by a recovery search space ID (recoverySearchSpaceId).

The CORESET associated with the BFR search space can be associated with a search space other than the BFR search space and the CORESET is not occupied by the BFR, and thus flexible scheduling can be more flexibly achieved.

Embodiment 3-2

Figure 6B:
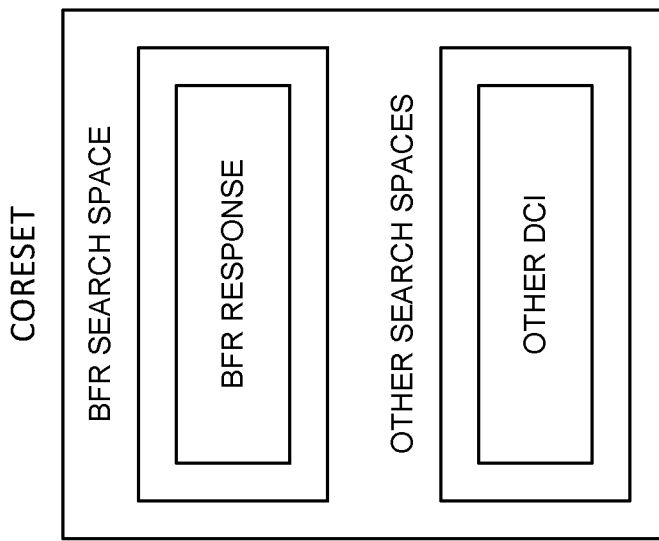

As shown in FIG. 6B, the UE may receive a BFR response by using at least one of search spaces not dedicated to the BFR and CORESETs not dedicated to the BFR. The UE may receive the BFR response in any search space within any CORESET. The UE may receive the BFR response in at least one of search spaces and CORESETs in which the PDCCH (DCI) other than for the BFR is transmitted.

For distinction of first DCI indicating a BFR response from second DCI not indicating a BFR response, at least one of Embodiments 3-2-1 and 3-2-2 described below may be used.

Embodiment 3-2-1

The first DCI indicating a BFR response and the second DCI not indicating a BFR response may each be in a specific DCI format including specific fields. For example, 1 bit in a specific field in the DCI may indicate whether the DCI is a BFR response.

Based on a specific field in the received DCI, the UE may determine whether the BFR procedure is complete. Completion of the BFR procedure may be interpreted as reception of the first DCI, reception of a BFR response, and so on. The UE having transmitted a BFRQ in the BFR procedure may consider that the BFR procedure is complete in a case where the specific field in the received DCI indicates a BFR response.

Thus, either the BFR on PCell or the BFR on SCell may be configured for the UE by using higher layer signaling. The BFR on PCell may be the BFR in Rel. 15 NR, or may be interpreted as at least one of detection of a BF in the PCell, transmission of a BFRQ in the PCell, and reception of a BFR response in the PCell.

The UE for which the BFR on PCell is configured may monitor the DCI in the BFR search space of the PCell, and in a case of receiving the DCI, consider that the BFR procedure is complete. The UE for which the BFR on PCell is configured may monitor the DCI in the PCell or the SCell, and in a case where the specific field in the received DCI indicates a BFR response, consider that the BFR procedure is complete.

The UE for which the BFR on SCell is configured may monitor the DCI in the BFR search space of the PCell, and in a case of receiving the DCI, consider that the BFR procedure is complete. The UE for which the BFR on SCell is configured may monitor the DCI in the PCell or the SCell, and in a case where the specific field in the received DCI indicates a BFR response, consider that the BFR procedure is complete.

Embodiment 3-2-2

A specific RNTI for the first DCI indicating a BFR response may differ from an RNTI for the second DCI not indicating a BFR response (for example, C-RNTI, Random Access (RA)-RNTI, and so on). The first DCI with the CRC scrambled with the specific RNTI may indicate a BFR response, and the second DCI with the CRC scrambled with an RNTI different from the specific RNTI need not indicate a BFR response. The specific RNTI may be an RNTI for BFR (for example, a BFR-RNTI). The UE may receive the specific RNTI (for example, a BFR configuration including the specific RNTI (BeamFailureRecoveryConfig)) by using higher layer signaling.

The UE may determine whether the BFR procedure is complete, based on which RNTI has been used to receive the DCI. Completion of the BFR procedure may be interpreted as reception of the first DCI, reception of a BFR response, and so on. The UE having transmitted a BFRQ in the BFR procedure may monitor the first DCI by using the specific RNTI, and in a case of receiving the first DCI, consider that the BFR procedure is complete.

Thus, either the BFR on PCell or the BFR on SCell may be configured for the UE by using higher layer signaling.

The UE for which the BFR on PCell is configured may monitor the DCI in the BFR search space of the PCell by using a C-RNTI, and in a case of receiving the DCI, consider that the BFR procedure is complete. The UE for which the BFR on PCell is configured may monitor the first DCI in the PCell or the SCell by using the specific RNTI, and in a case of receiving the first DCI, consider that the BFR procedure is complete.

The UE for which the BFR on SCell is configured may monitor the DCI in the BFR search space of the PCell by using the C-RNTI, and in a case of receiving the DCI, consider that the BFR procedure is complete. The UE for which the BFR on SCell is configured may monitor the first DCI in the PCell or the SCell by using the specific RNTI, and in a case of receiving the first DCI, consider that the BFR procedure is complete.

Embodiment 3-3

The UE need not assume (expect) that, in the BFR on SCell, a BFR response is to be received.

In a case where a given time (for example, k symbols or M ms) has elapsed since transmission of a BFRQ by the UE, the UE may consider that the BFR procedure is complete.

The UE, having considered that the BFR is complete, may perform at least one of reception of a DL signal and transmission of a UL signal by using a new beam identified in the BFR procedure. The new beam may be interpreted as a candidate beam, a candidate beam reference signal (RS), a TCI state, a spatial domain transmission filter, a spatial domain reception filter, spatial relation information, an SRS resource, and so on.

In a case where the BFRQ is not normally received by the base station, discrepancy in the recognition of the new beam occurs between the UE and the base station. However, the UE and the base station may execute the BFR procedure or the RLF procedure to identify a new beam again.

Embodiment 3-4

The UE may determine whether to receive a BFR response in the BFR on SCell based on the BFRQ transmission method in the BFR on SCell. As shown in FIG. 7, the UE may assume that a BFR response is to be received in a case of using the type 1-BFRQ transmission and may assume that no BFR response is to be received in a case of using the type 2-BFRQ transmission.

An error rate for the type 2-BFRQ transmission may be lower than an error rate for the type 1-BFRQ transmission.

In a case where the UE uses the type 1-BFRQ transmission with a relatively high error rate, a decrease in the reliability of the BFR procedure can be suppressed by receiving a BFR response. In a case where the UE uses the type 2-BFRQ transmission with a relatively low error rate, consumption of PDCCH resources, the search space for BFR, CORESETs, RNTIs, DCI bits, and so on can be prevented by refraining from reception of a BFR response. The PDCCH is not received, and thus the BFR procedure is not affected by an error rate for the PDCCH.

The type 1-BFRQ transmission may include the PRACH (for example, S104 in FIG. 1). The type 1-BFRQ transmission may include the SR on the PUCCH.

The type 2-BFRQ transmission may include the UCI (except for the SR) on the PUCCH. The type 2-BFRQ transmission may include the MAC CE.

The type 1-BFRQ transmission may include CFRA, and the type 2-BFRQ transmission may include CBRA.

Embodiment 3-5

The UE may determine whether to receive a BFR response in the BFR on SCell, based on the reported UE capability information.

The UE may assume that no BFR response is to be received in the BFR on SCell in a case where the specific capability information is reported by using the UE capability information. The specific capability information may indicate that no BFR response is to be received in the BFR on SCell or indicate the capability corresponding to a given release after Rel. 16.

According to the third embodiment described above, consumption of at least one of the search space, the CORESETs, the RNTIs, and the DCI bits can be suppressed. The BFR is prevented from occupying the CORESETs, allowing scheduling to be more flexibly achieved.

Fourth Embodiment

The UE may assume that a BFR response is to be received from the cell having transmitted a BFRQ. In a case where the BFR response is received by using the DCI, the UE monitors the DCI in the search space of the cell having transmitted the BFRQ.

The UE may determine the cell to which the BFRQ is to be transmitted depending on whether the PUCCH on SCell is configured or not.

Figure 8A:
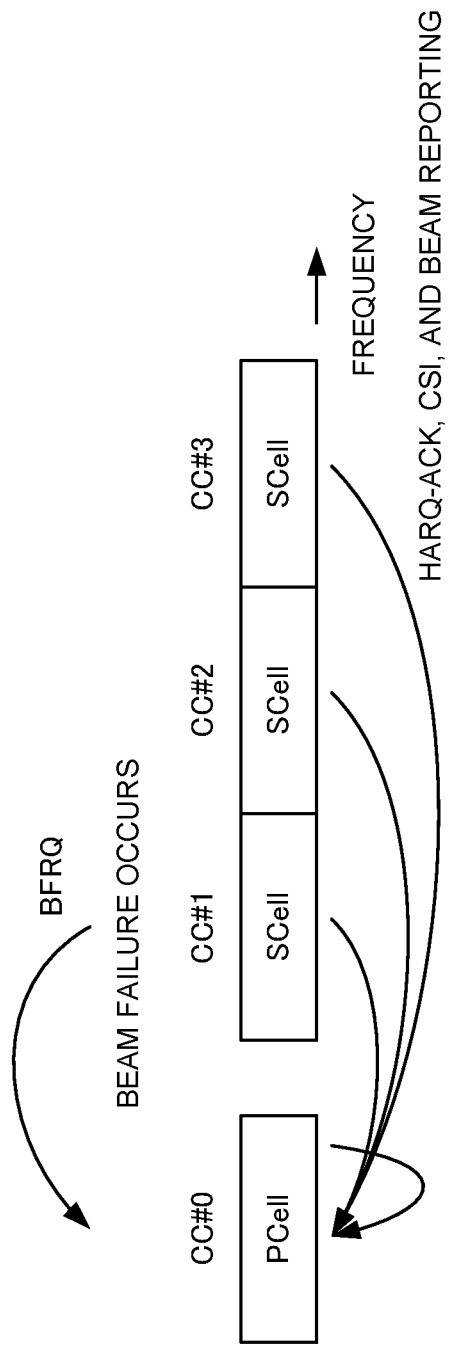
FIGS. 8A and 8B are diagrams to show examples of a method for determining a cell to which a BFRQ is to be transmitted.

As shown in FIG. 8A, in a case where the PUCCH on SCell is not configured, the UE may transmit the BFRQ to the PCell (for example, in a case where a BF has occurred in a cell within a Master Cell Group (MCG)) or a Primary Secondary Cell (PSCell, for example, in a case where a BF has occurred in a Secondary Cell Group (SCG)). The PCell or the PSCell may be referred to as a Special Cell (SpCell). In this case, the UE may assume that a BFR response is to be received from the PCell or the PSCell.

Figure 8B:
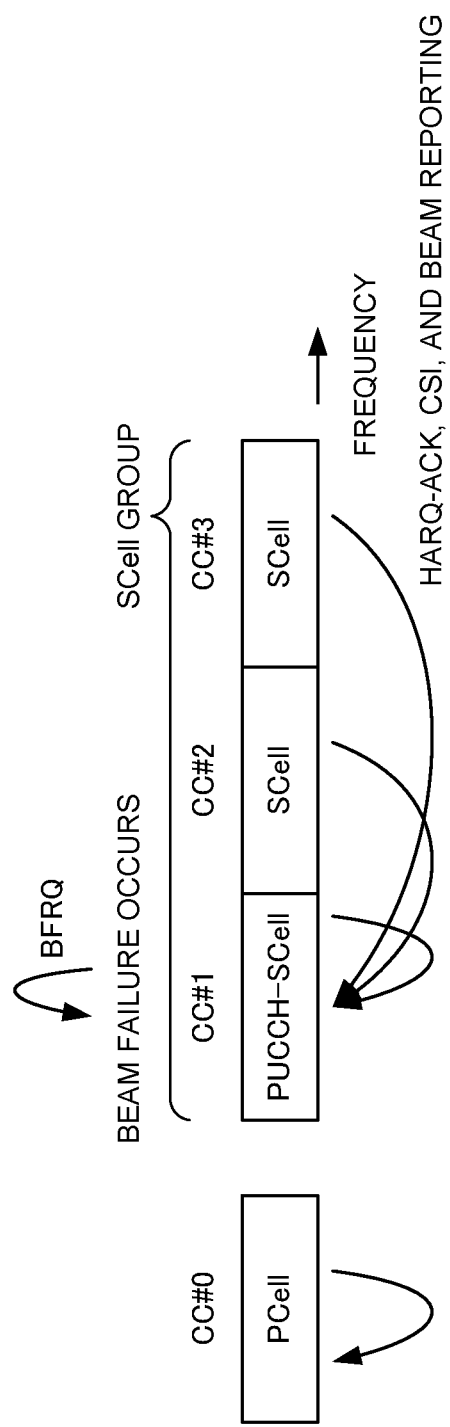

As shown in FIG. 8B, in a case where the PUCCH on SCell is configured for the UE and where a BF occurs in the SCell, the UE may transmit the BFRQ to the PUCCH-SCell. In this case, the UE may assume that a BFR response is to be received from the PUCCH-SCell.

In a case where the PUCCH on SCell is configured for the UE and where a BF occurs in the PCell, the UE may transmit the BFRQ to the PCell. In this case, the UE may assume that a BFR response is to be received from the PCell.

According to the fourth embodiment described above, the cell from which the BFR response is to be transmitted is clarified, and the UE can appropriately receive the BFR response.

Fifth Embodiment

The UE may determine one of a plurality of BFRQ transmission methods, based on whether the PUCCH on SCell is configured or not.

The plurality of BFRQ transmission methods may include BFRQ transmission using the PUCCH. The plurality of BFRQ transmission methods may include SR-based BFRQ transmission (SR-based BFRQ transmission 1 or 2) and UCI-based BFRQ transmission as described in Embodiment 1-3.

As shown in FIG. 9A, in a case where the PUCCH on SCell is not configured for the UE, the UE may transmit the BFRQ to the PCell or the PSCell by using UCI-based BFRQ transmission. As shown in FIG. 9B, in a case where the PUCCH on SCell is configured for the UE and where a BF occurs in the SCell, the UE may transmit the BFRQ to the PUCCH-SCell by using SR-based BFRQ transmission.

In a case where the PUCCH on SCell is not configured for the UE, the UE may transmit the BFRQ to the PCell or the PSCell by using the SR-based BFRQ transmission. In a case where the PUCCH on SCell is configured for the UE and where a BF occurs in the SCell, the UE may transmit the BFRQ to the PUCCH-SCell by using the UCI-based BFRQ transmission.

In a case where the PUCCH on SCell is configured for the UE and where a BF occurs in the PCell, the UE may transmit the BFRQ to the PCell by using one of the UCI-based BFRQ transmission, the SR-based BFRQ transmission, and other BFRQ transmission (for example, the PRACH or MAC CE).

According to the fifth embodiment described above, the cell to which the BFRQ is to be transmitted is clarified, and the UE can appropriately transmit the BFRQ response. The UE determines the BFRQ transmission method including the BFRQ transmission using the PUCCH, allowing the BFRQ transmission to be more flexibly achieved. Depending on whether the PUCCH on SCell is configured or not, the amount of resources, the error rate, and so on for the BFRQ transmission are changed, allowing the BFRQ transmission suitable for the situation to be achieved.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
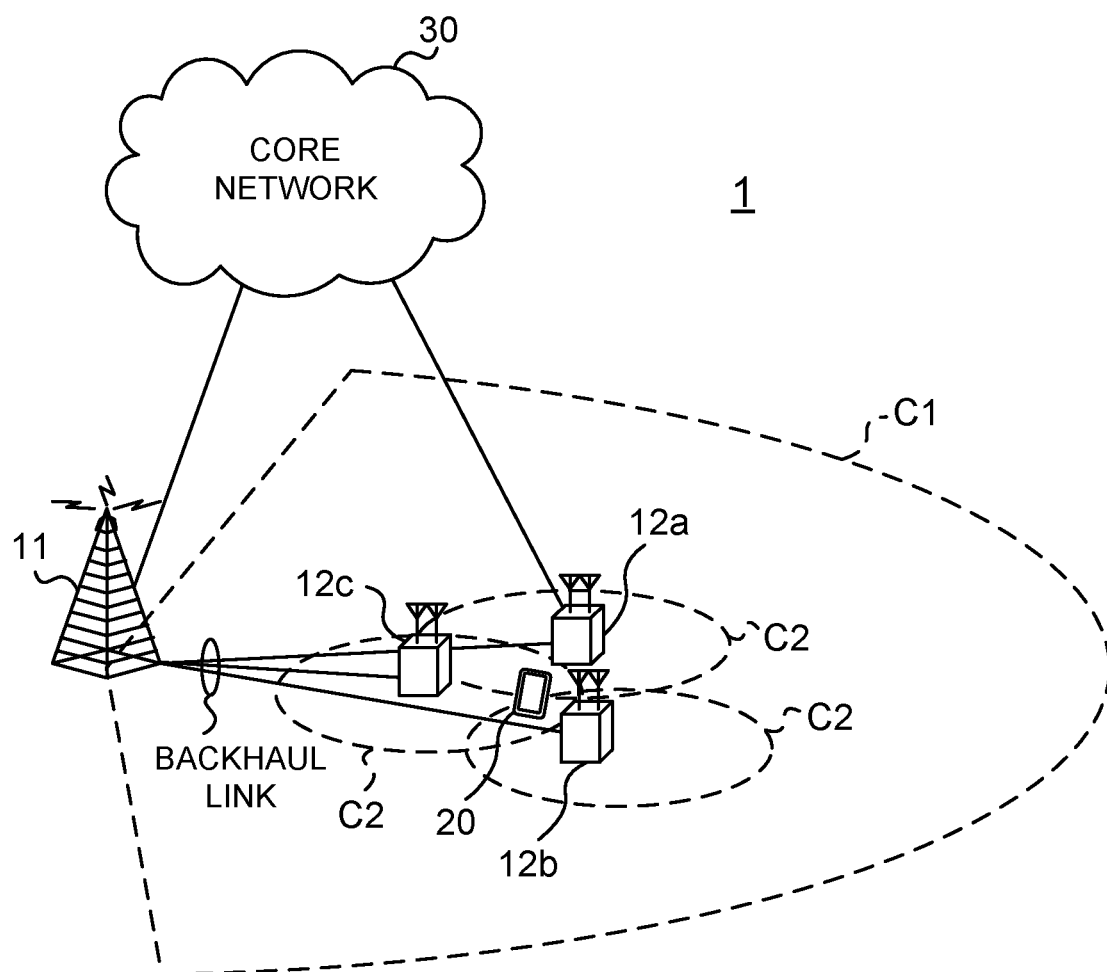
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2(FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
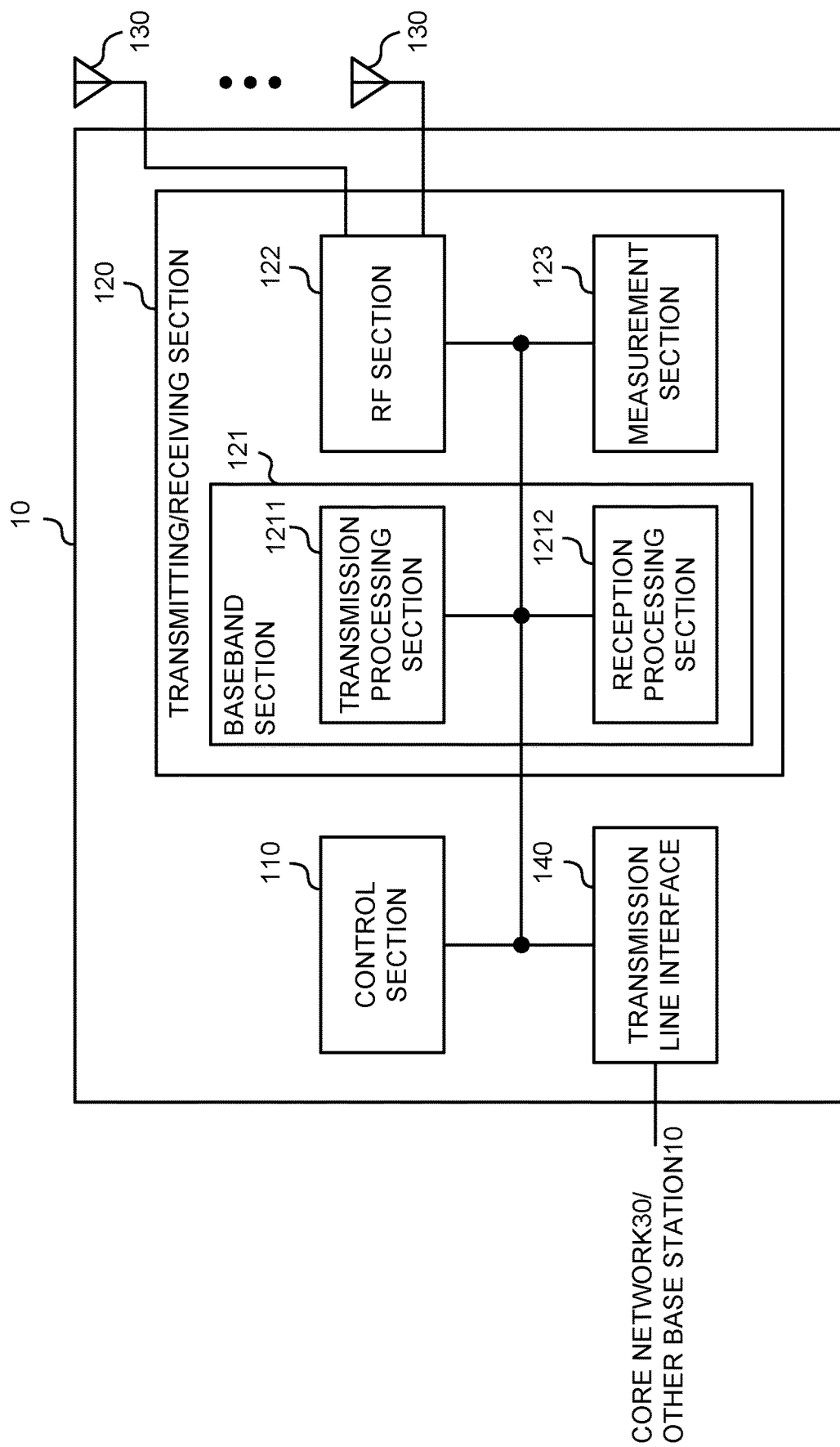
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120 and the transmitting/receiving antennas 130.

(User Terminal)

Figure 12:
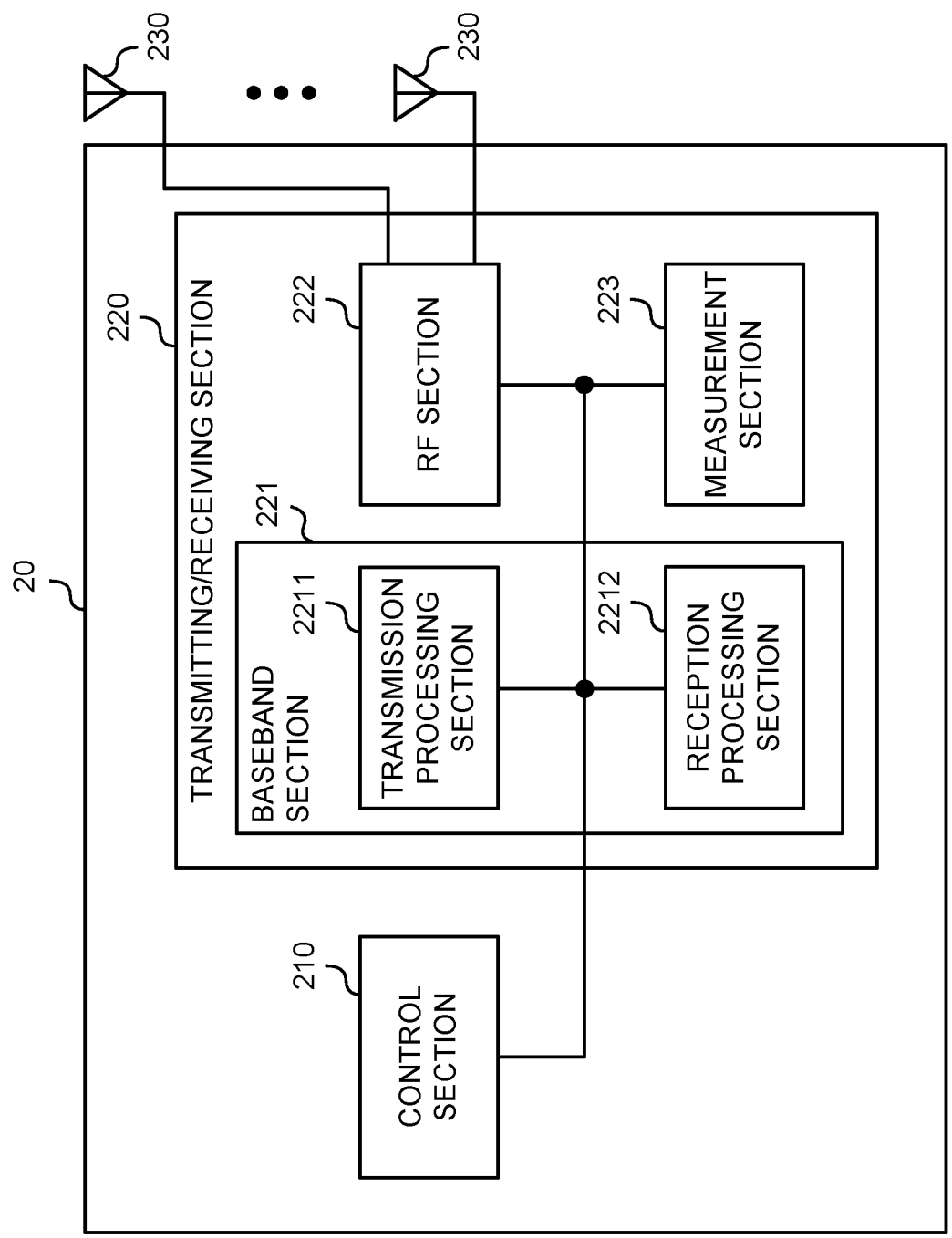
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the control section 210 may control a beam failure recovery (BFR) based on whether a specific secondary cell (for example, the PUCCH-SCell) for an uplink control channel (for example, the PUCCH) is configured. The transmitting/receiving section 220 may transmit, in the beam failure recovery, a beam failure recovery request (BFRQ) to one of a plurality of cells (for example, the PCell and the SCells).

The control section 210 may control the beam failure recovery based on the maximum number of secondary cells (for example, the BFR-SCells) to which the beam failure recovery is applied (for example, the BFR-SCells maximum number or the number of SCells supporting the BFR on SCell).

The control section 210 may determine the maximum number of secondary cells to which the beam failure recovery is applied, based on one of a plurality of types of the beam failure recovery request (for example, the type 1-BFRQ transmission and the type 2-BFRQ transmission), the one type of the beam failure recovery request being to be transmitted.

In a case where the maximum number of secondary cells to which the beam failure recovery is applied is 1 or larger and where the specific secondary cell is configured, the control section 210 may apply the beam failure recovery to the specific secondary cell.

The control section 210 may consider that the beam failure recovery is complete, based on the field included in the downlink control information (for example, the specific field) or the radio network temporary identifier used for the downlink control information (for example, the specific RNTI or BFR-RNTI).

In a case where the maximum number of secondary cells to which the beam failure recovery is applied is 1 and where the specific secondary cell for the uplink control channel is configured, the control section 210 may apply the beam failure recovery to the specific secondary cell. The transmitting/receiving section 220 may transmit, in the beam failure recovery, the beam failure recovery request (BFRQ) to one of a plurality of cells.

In a case of applying the beam failure recovery to the specific secondary cell, the control section 210 may control at least one of detection of a beam failure in the specific secondary cell, transmission of a beam failure recovery request to the specific secondary cell, and reception of a beam failure recovery response from the specific secondary cell.

The maximum number may be defined in the specifications.

The transmitting/receiving section 220 may report the capability information including the maximum number.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
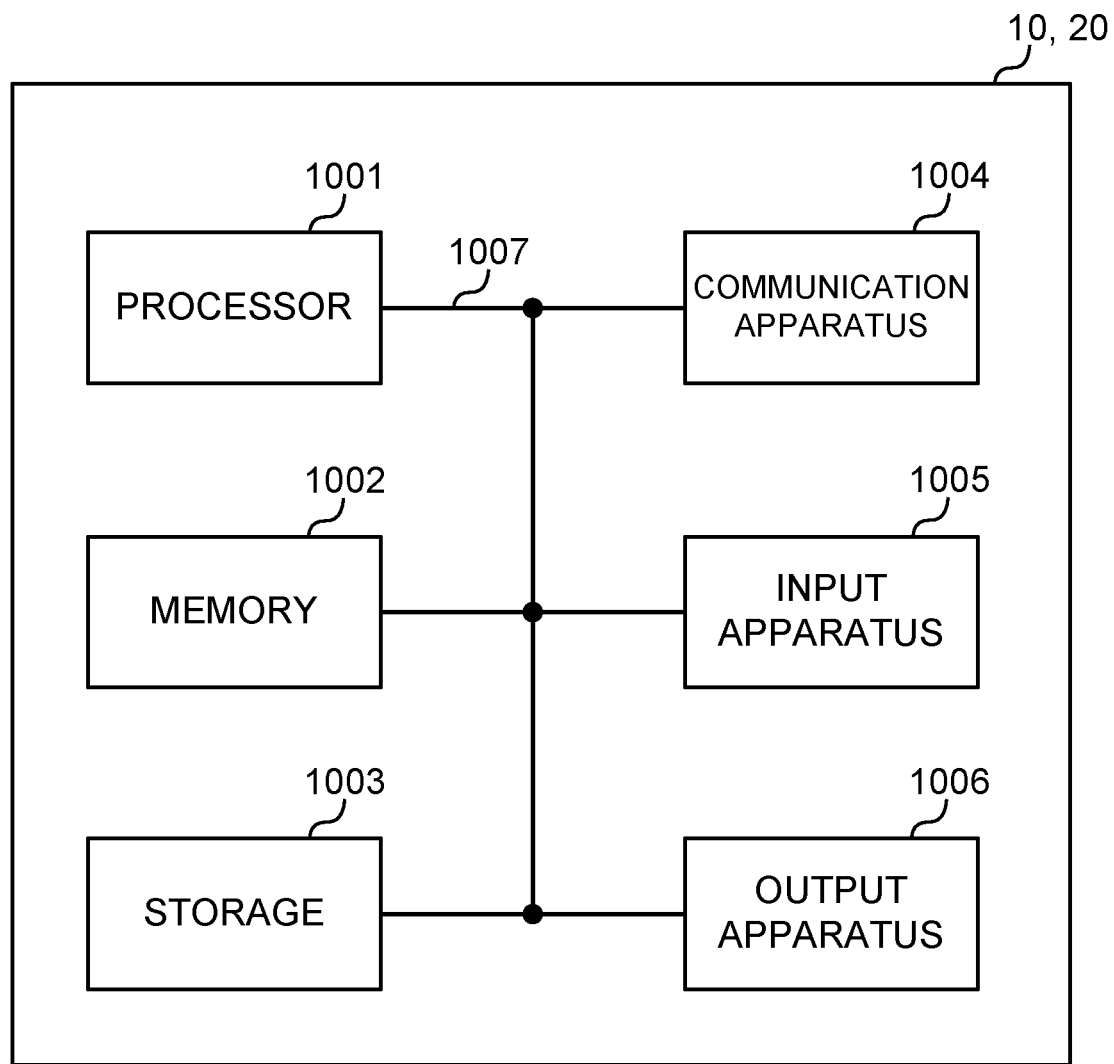
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that controls beam failure recovery based on whether or not a certain secondary cell for an uplink control channel is configured; and
a transmitter that transmits a beam failure recovery request to one of a plurality of cells in the beam failure recovery,
wherein the processor is configured to control the beam failure recovery based on a maximum number of secondary cells to which the beam failure recovery to the beam failure recovery request transmitted by Medium Access Control Control Element, MAC CE, is applied, and
a maximum number of secondary cells to which the beam failure recovery to the beam failure recovery request transmitted by Physical Random Access Channel, PRACH, is applied, is smaller than the maximum number of secondary cells to which the beam failure recovery to the beam failure recovery request transmitted by the MAC CE, is applied.

2. The terminal according to claim 1, wherein when the maximum number of secondary cells to which the beam failure recovery to the beam failure recovery request transmitted by the MAC CE, is applied is one or more and when the certain secondary cell is configured, the processor applies the beam failure recovery to the certain secondary cell.

3. The terminal according to claim 2, wherein the processor considers, based on a field included in downlink control information or a radio network temporary identifier used for the downlink control information, that the beam failure recovery is completed.

4. The terminal according to claim 1, wherein the processor considers, based on a field included in downlink control information or a radio network temporary identifier used for the downlink control information, that the beam failure recovery is completed.

5. The terminal according to claim 1, wherein the processor is configured to control the beam failure recovery based on a maximum number of secondary cells to which the beam failure recovery to the beam failure recovery request transmitted by the PRACH, is applied.

6. A radio communication method for a terminal, comprising:
controlling beam failure recovery based on whether or not a certain secondary cell for an uplink control channel is configured;
transmitting a beam failure recovery request to one of a plurality of cells in the beam failure recovery; and
controlling the beam failure recovery based on a maximum number of secondary cells to which the beam failure recovery to the beam failure recovery request transmitted by Medium Access Control Control Element, MAC CE, is applied; and
a maximum number of secondary cells to which the beam failure recovery to the beam failure recovery request transmitted by Physical Random Access Channel, PRACH, is applied, is smaller than the maximum number of secondary cells to which the beam failure recovery to the beam failure recovery request transmitted by the MAC CE, is applied.

7. A system comprising a terminal and a base station, wherein
the terminal comprises:
a processor that controls beam failure recovery based on whether or not a certain secondary cell for an uplink control channel is configured; and
a transmitter that transmits a beam failure recovery request to one of a plurality of cells in the beam failure recovery,
wherein the processor is configured to control the beam failure recovery based on the maximum number of secondary cells to which the beam failure recovery to the beam failure recovery request transmitted by Medium Access Control Control Element, MAC CE, is applied; and
a maximum number of secondary cells to which the beam failure recovery to the beam failure recovery request transmitted by Physical Random Access Channel, PRACH, is applied, is smaller than the maximum number of secondary cells to which the beam failure recovery to the beam failure recovery request transmitted by the MAC CE, is applied; and
the base station comprises:
a processor that determines whether or not the certain secondary cell is configured; and
a receiver that receives the beam failure recovery request.

* * * * *